United States Patent

Hills

[11] Patent Number: 5,938,227
[45] Date of Patent: Aug. 17, 1999

[54] WINCH DRIVEN BALL JOINT HITCH GUIDANCE SYSTEM

[76] Inventor: Warren E. Hills, 2641 27th St., Clarkston, Wash. 99403

[21] Appl. No.: 08/893,213

[22] Filed: Jul. 15, 1997

[51] Int. Cl.$^6$ ....................................................... B60D 1/06
[52] U.S. Cl. ............................ 280/511; 280/508; 280/480
[58] Field of Search .................................... 280/511, 508, 280/480, 477

[56] References Cited

U.S. PATENT DOCUMENTS

| | | | |
|---|---|---|---|
| 1,734,072 | 11/1929 | Blalack | 280/480 |
| 1,985,468 | 2/1934 | Strang | 280/480 |
| 2,736,575 | 2/1956 | Gebhart | 280/480 |
| 3,345,082 | 10/1967 | Atkins | 280/480 |
| 3,596,925 | 8/1971 | Richie | 280/477 |
| 3,761,113 | 9/1973 | Smitherman | 280/480 |
| 3,848,895 | 11/1974 | Christopher | 280/511 |
| 4,131,296 | 12/1978 | Strader | 280/477 |
| 4,283,072 | 8/1981 | Deloach, Jr. | 280/477 |
| 4,466,632 | 8/1984 | DeVorak | 280/477 |
| 4,807,899 | 2/1989 | Belcher | 280/477 |
| 5,005,852 | 4/1991 | Smyly, Sr. | 280/477 |
| 5,048,854 | 9/1991 | Clark | 280/477 |
| 5,072,962 | 12/1991 | Webb | 280/511 |
| 5,085,408 | 2/1992 | Norton et al. | 280/477 |

*Primary Examiner*—Lanna Mai
*Assistant Examiner*—Andrew J. Fischer

[57] ABSTRACT

A winch driven cable guidance system for coupling trailers to tow vehicles. The system comprises of trailer having a trailer hitch coupler, a tow vehicle having a coupling ball joint, and a cable whereby one end of the cable is connected by means of a cable pulley guidance system and secured to a cable drum of a winch. The winch powers the cable drum to reel in the cable and the attached trailer to assist in connecting the trailer to the towing vehicle, thus effecting a universal joint between the trailer and towing vehicle.

16 Claims, 4 Drawing Sheets

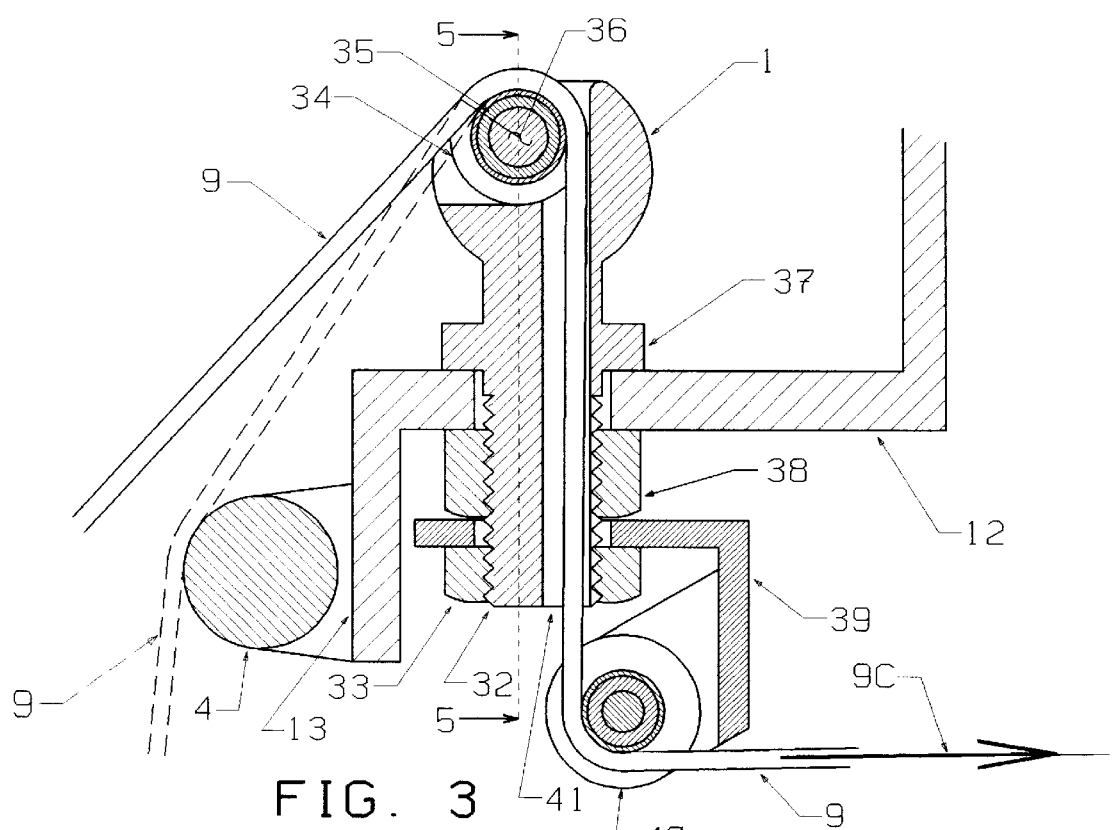
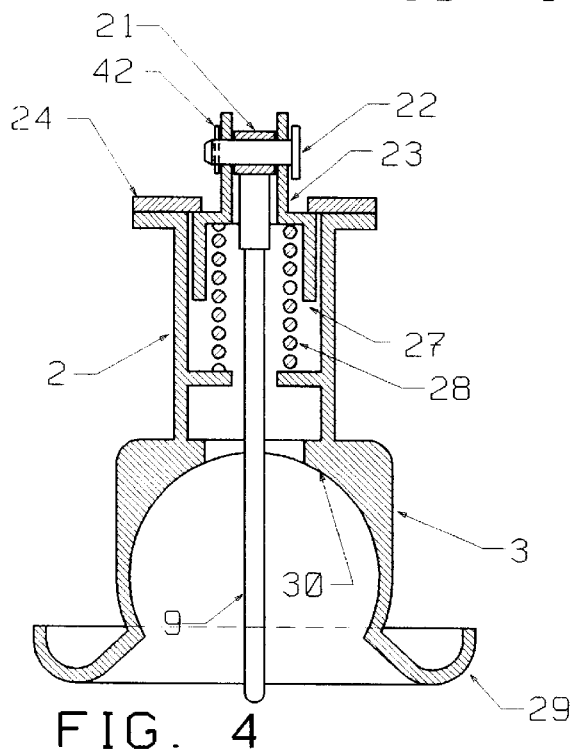
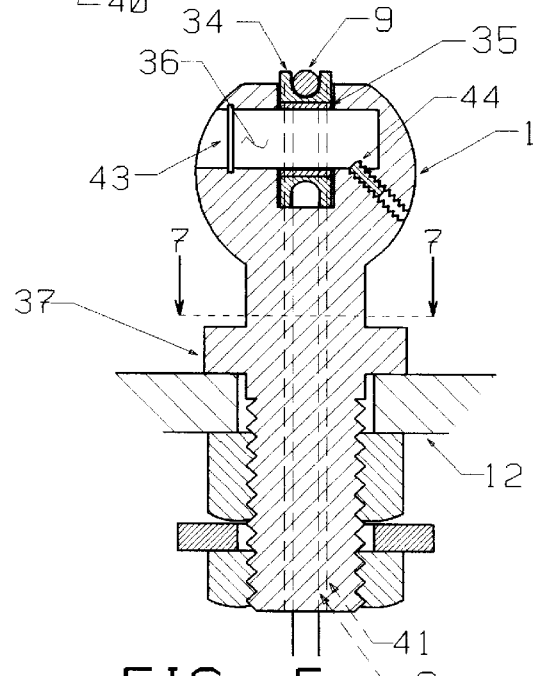
FIG. 3
FIG. 4
FIG. 5

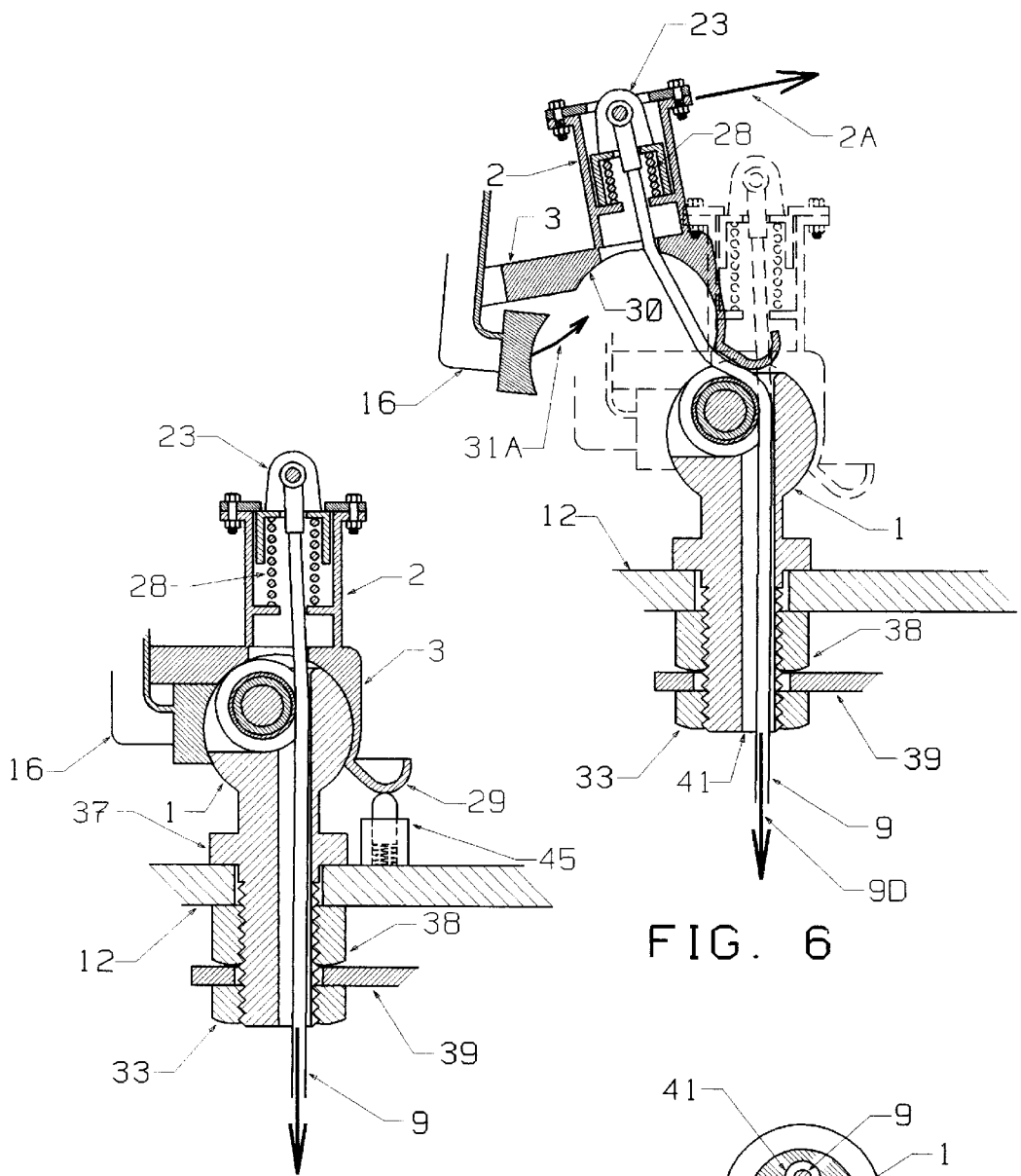

WINCH DRIVEN BALL JOINT HITCH GUIDANCE SYSTEM

BACKGROUND OF THE INVENTION

This invention relates to the ease of coupling a trailer to a towing vehicle and is more particularly concerned with improvements to a coupling ball joint between a trailer and towing vehicle, whereby the coupling is well suited for highway use. This invention provides an easy method of coupling between a trailer and a towing vehicle with a coupling ball joint without the need of accurate positioning alignment of the trailer and towing vehicle to effect a coupling hitch connection.

Prior art proposes a variety of methods to draw a trailer to a towing vehicle by means of a winch driven cable hitch system. Representative of such winch assisted hitches are the following; U.S. Pat. Nos.; Clark, Pat. No. 5,048,854, Issued Sep. 17, 1991; Belcher, Pat. No. 4,807,899, Issued Mar. 4, 1988, and DeVorak, Pat. No. 4,466,632, Issued Aug. 21, 1984. These devises provide for an operator to position the location of a towing vehicle where upon a hitch connection or coupling ball attached to the towing vehicle is within close proximity of a hitch connection or trailer hitch coupler attached to the trailer such that the length of cable on a winch drum can be drawn off the winch drum and connected to the trailer hitch coupler without realignment of either the trailer or the towing vehicle. After the cable connection is made on the trailer hitch coupler, the winch is driven to draw the trailer to the towing vehicle by means of the winch system and thus effect a connection between the trailer and towing vehicle.

This invention is an improvement on the above described prior art by simplifying and eliminating the tongue and sleeve parts and associated locking pins, thereby improving the strength and reliability of the hitch system and reducing the costs of manufacture of said hitch systems.

Additionally, this invention eliminates the problems associated with engagement of a tongue and sleeve arrangement that is characteristic of the above mentioned prior art. One of the problems is the high load stresses on the cable from the trailer weight as the tongue is being drawn into the sleeve at odd angles of engagement, thereby increasing the risk of cable breakage and safety to the operator. The Clark '854 Patent best reduces this problem by allowing the sleeve assembly attached to the towing vehicle to pivot and self align as the trailer is being drawn to the towing vehicle by means of the winch system.

Another improvement to prior art of a coupling ball joint is that the alignment of the trailer hitch coupler to the coupling ball must be precise in order to effect proper engagement to allow the operator to secure the connection with a locking lever. If the alignment is not precise the trailer hitch coupler will bind over the coupling ball on the locking lever mechanism of the trailer hitch coupler and further manual assistance by the operator is required to get proper engagement to actuate the locking lever for securing the connection. Sometimes the operator will have to move the tow vehicle slightly forward to effect proper engagement or nesting of the trailer hitch coupler over the coupling ball. This invention will provide an assist for the nesting of the trailer hitch coupler over the coupling ball by means of the cable and winch drawing the trailer hitch to the tow vehicle.

SUMMARY OF THE INVENTION

This invention is an improvement to a winch driven hitch system which draws a trailer to a towing vehicle by means of a connecting cable. The hitch includes a coupling ball joint to provide a universal coupling between trailer and towing vehicle suitable for highway travel.

These improvements more particularly apply to changes in prior art to the coupling ball joint of the hitch system which allows the connecting cable to guide through the coupling ball of the tow vehicle effecting engagement of the trailer to the towing vehicle. Said coupling is easily made by unreeling cable from a winch through the coupling ball of the towing vehicle and connecting the cable to the trailer tow bar for drawing the trailer to the towing vehicle. The cable is connected to the trailer hitch coupler in a manner which will become apparent from the following detailed description of the drawings and is easily made although the trailer is located well behind the towing vehicle and off to one side. The cable connection attached to the trailer hitch coupler is pinned to a spring actuated contact. The spring actuated connection will keep the cable taut to effect engagement of the trailer hitch coupler to the coupling ball of the tow vehicle, when the operator is remotely operating the winch controls to draw the trailer hitch coupler to the towing vehicle.

After engagement of the coupling ball joint to the trailer hitch coupler, the operator will perform the normal actions of securing the hitch similar to other prior art trailer hitches. The cable remains affixed to the trailer hitch coupler after engagement of the coupling ball joint and while towing the trailer with the towing vehicle for highway use, thereby providing additional security for the hitch system attachment to the tow vehicle. The cable connection to the trailer hitch coupler is disconnected at such time when the hitch system is disengaged and the cable is unreeled from the winch to loosen and disconnect the cable.

Said winch can be electrically or manually operated and mounted at any convenient location on the towing vehicle with the required cable pulley arrangement to effect pulling the cable through the coupling ball of the hitch system, either to reel or unreel said cable for effecting engagement or disengagement of the hitch system.

Generally as the trailer is drawn to the towing vehicle the trailer hitch coupler will drag on the ground until the trailer hitch coupler is in close proximity of the towing vehicle. Then the cable will lift the trailer hitch coupler onto the coupling ball by means of the cable and guiding pulleys, one of which is mounted in the coupling ball and is principle to effect the engagement of the trailer hitch coupler onto coupling ball without the requirement of a tongue, guide sleeve, and locking pin as in prior art.

The principal objective of this invention is to improve prior art by simplifying the parts of the hitch system thereby providing a more reliable operation of the equipment and to eliminate the need for essentially what is a hitch of a hitch or redundancy of hitches that is common in prior art, whereby the operator must make final alignment and pin additional tongue and sleeve assemblies to effect a rigid engagement of the hitch system which is in turn a part of another coupling ball joint assembly.

Another objective of this invention as a result of a simpler arrangement of parts than prior art is to reduce the manufacturing costs of the hitch system by reducing the number of pieces comprising the embodiment of a hitch system.

Another objective is to reduce cable wear by providing rolling surfaces and sliding surfaces with large bending radii to reduce the frictional wear on the cable as the cable is drawn through the coupling ball for final engagement of the trailer hitch coupler.

Another objective is to provide a cable guidance system that will allow for locating the winch at any convenient mounting place on the tow vehicle so that said winch could be used for other applications. In addition, said winch could be located under the tow vehicle out of sight and remote from any equipment on the under side of the tow vehicle such as a spare tire.

Still another object of this invention allows for greater flexibility in misalignment of the tow vehicle with respect to the trailer to effect engagement of the hitch system. This is because the gravity of the trailer in most cases will force the hitch coupler of the trailer in a downward pull on the cable as the trailer is drawn to the tow vehicle by means of the cable and causing the cable to nest in the pulley of the coupling ball independent of the direction of alignment of the trailer with respect to the tow vehicle.

Still another objective of this invention is to keep the cable of this hitch system from binding over the coupling ball as engagement is accomplished, thereby preventing cable damage and proper nesting of the trailer hitch coupler over the coupling ball to effect a universal joint between the trailer and towing vehicle.

Another objective of this invention is to produce an assist to the operator to make easier the engagement of a coupling ball joint. Prior art requires careful alignment of the trailer hitch coupler over the coupling ball to prevent binding of the trailer hitch coupler over the coupling ball. The cable assist in this invention would be connected to the trailer hitch coupler so as to eliminate this binding effect, thus self aligning the coupling ball joint by means of drawing the cable through the coupling ball to effect engagement of the hitch system.

The novel concepts of the present invention will be more fully realized and understood from the following detailed description when taken with the accompanying drawings. In addition, other modifications and variations may be effected without departing from the spirit and scope of the novel concepts of the disclosure.

BRIEF DESCRIPTION OF THE DRAWINGS

FIG. 3 is an enlarged fragmentary vertical sectional view taken generally along the dashed line of 3—3 of FIG. 1.

FIG. 4 is a fragmentary sectional view taken generally along the dashed line of 4—4 of FIG. 2.

FIG. 5 is a fragmentary sectional view taken generally along the dashed line of 5—5 of FIG. 3.

FIG. 6 is a fragmentary combined view of the sectional views of FIG. 2 and FIG. 3 showing the position of the trailer hitch coupler relative to the tow vehicle coupling ball immediately prior to engagement of the coupling ball joint. The dashed outline of the trailer hitch of FIG. 6 is in the final nested position of the coupling ball joint.

FIG. 7 is a sectional view taken generally along the dashed line of 7—7 of FIG. 5.

FIG. 8 is a fragmentary combined view of the sectional views of FIG. 2 and FIG. 3 showing the nested position of the trailer hitch coupler on the tow vehicle coupling ball immediately after engagement of the coupling ball joint.

DETAILED DESCRIPTION

Figure 1:
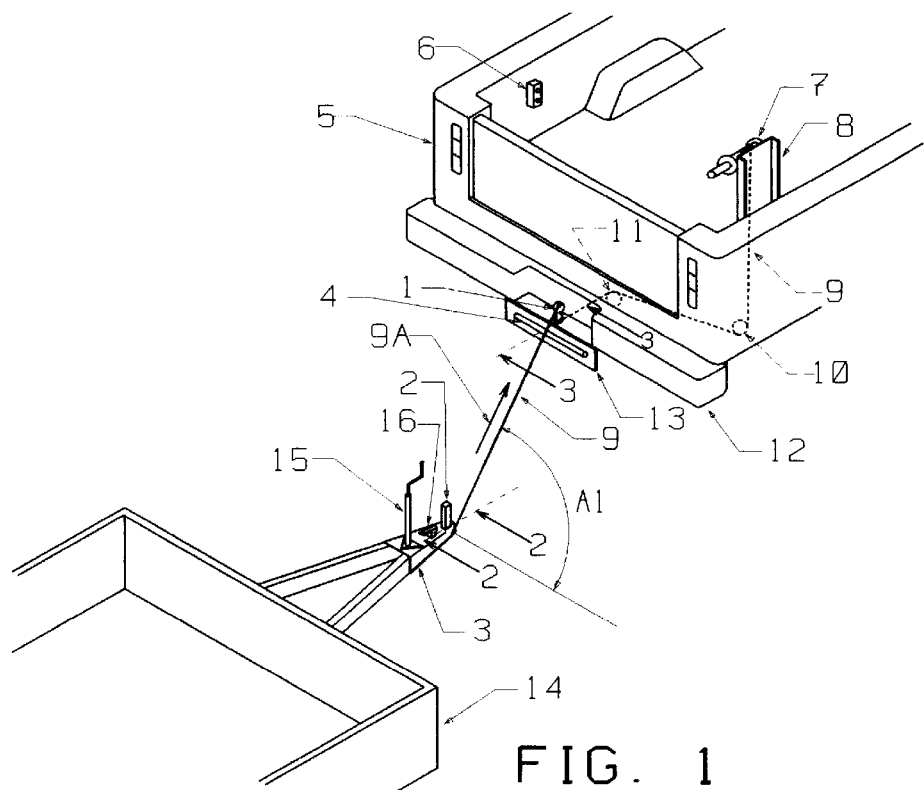
FIG. 1 is a fragmentary perspective view showing the hitch system of this invention whereby a coupling ball is mounted on the rear bumper of a tow vehicle and attached to the tow bar of a trailer with a cable, whereby the cable is wound on the drum of a winch. Said winch is mounted on the rear right side of the tow vehicle.

With reference to the appended drawings, FIG. 1 shows the relative positions of the tow vehicle 5 with the trailer 14 connected by the cable 9. The Cable 9 of FIG. 1 is connected to the trailer hitch coupler 3 by means of a pin or similar connection in the housing 2 which is a part of the trailer hitch coupler 3. Also shown in FIG. 1 is the trailer hitch coupler 3, which is attached to the tow bar of the trailer 14. The screw jack 15, which is mounted on the trailer hitch coupler 3, is used only for lifting the trailer 14 in a level position when parked and not connected to the tow vehicle 5. After the cable 9 is connected to the housing 2, the screw jack 15 will be retracted to the minimum position causing the weight of trailer 14 to transfer to the tow vehicle 5 and the cable 9 to become taut. Cable 9 is drawn in the direction 9A of FIG. 1 at a horizontal angle A1 through the coupling ball 1 mounted on the bumper 12 of the tow vehicle 5 and that said cable 9 is guided by a series of pulleys 11 and 10 to the cable drum of winch 7. Winch 7 is mounted on bracket 8 and can be hand operated or electric operated from a push button operator panel 6 mounted on the left rear of tow vehicle 5. FIG. 1 also shows a locking lever 16 which is a part of the trailer hitch coupler 3 and is standard equipment on coupling ball hitches, used to lock the trailer hitch coupler 3 to the coupling ball 1 after engagement of the hitch joint has been made. As the trailer 14 in FIG. 1 is drawn closer to the tow vehicle 5 by means of the winch 7 and cable 9 a horizontal roller 4, which is mounted on vertical plate 13, will contact cable 9 and provide for a rolling surface over which cable 9 will deflect as the trailer hitch coupler 3 is drawn onto the coupling ball 1 for engagement of the hitch. Vertical plate 13 is a part of the bumper 12.

Figure 2:
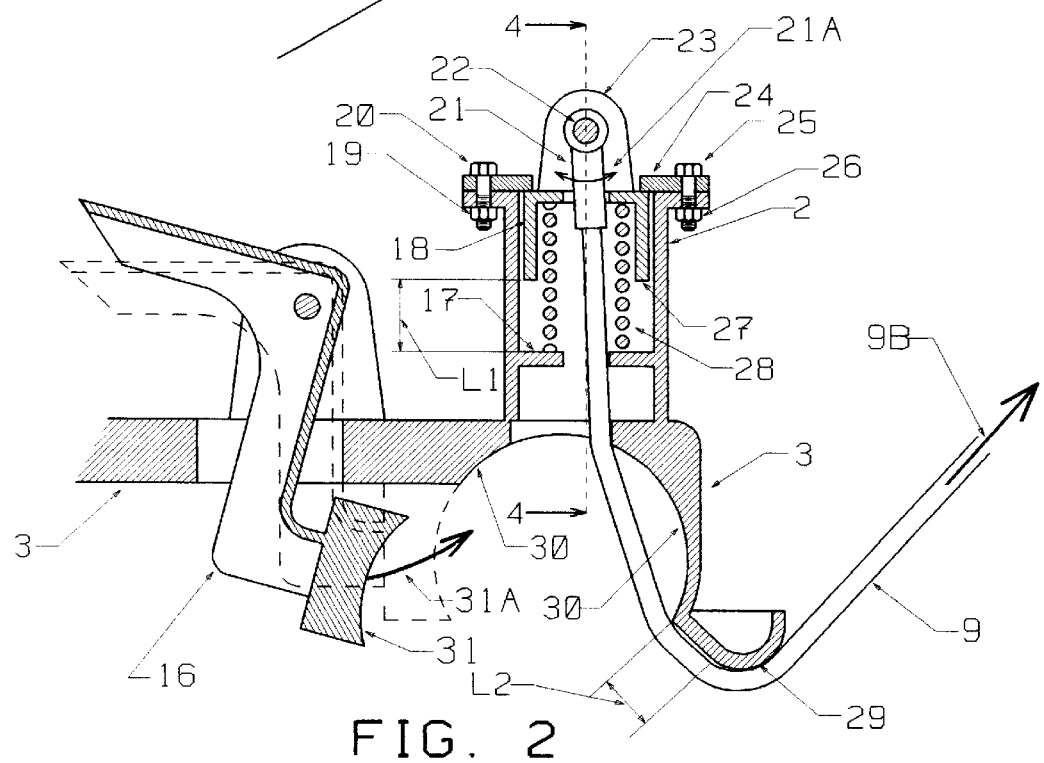
FIG. 2 is an enlarged fragmentary vertical sectional view taken generally along the dashed line of 2—2 of FIG. 1.

The cable 9 connection to housing 2 which is located on top of trailer hitch coupler 3 is best illustrated in FIG. 2 and FIG. 4. Cable 9 is fitted with an end connection 21 and is inserted through the bottom of hitch coupler 3 and up the center of spring 28 and pinned to clevis mount 23 by inserting pin 22. Pin 22 is then held in place with cotter pin 42 as best shown in FIG. 4. Said cable connection remains affixed to trailer hitch coupler 3 through out the operation of the winch 7 as the cable 9 is drawn through the coupling ball 1 and does not impede the engagement of the trailer hitch coupler 3 over the coupling ball 1. Clevis mount 23 allows end connection 21 to swivel back and forth in the direction of 21 A as shown in FIG. 2. Said swiveling action will also provide for unimpeded engagement of the trailer hitch coupler 3 over the coupling ball 1. Clevis mount 23 is made to slide on surface 18 along the length L1 inside housing 2 to effect compression of spring 28. As winch 7 operates to draw trailer 14 to towing vehicle 5, tension is made on cable 9 in the direction 9A of FIG. 1 and the direction 9B of FIG. 2 and causes spring 28 to compress. As best shown in FIG. 2 and FIG. 6, the compression of spring 28 is limited as surface 27 on clevis mount 23 contacts surface 17 on housing 2. Additionally, clevis mount 23 is held in place against the spring 28 load by plate 24 when there is no tension on cable 9. Plate 24 is bolted to housing 2 by means of bolts 20 and 25 and nuts 19 and 26. Spherical surface 30 is a part of trailer hitch coupler 3 and matches the spherical surface of the coupling ball 1. Locking lever 16 will remain in the open position as shown in FIG. 2 until nesting of the trailer hitch coupler 3 on coupling ball 1, as best shown with the dashed line in FIG. 6. Then locking lever 16 will rotate in the direction 31 A of FIG. 2 to contact spherical surface 31 on locking lever 16 against the coupling ball 1, thereby effecting a secure engagement of the hitch system.

Also shown in FIG. 2 is a curved surface 29 of the trailer hitch coupler 3 and elongated along length L2 forming a bowl shaped surface on the structure of trailer hitch coupler 3 to provide for a more gradual bending radii to reduce wear on the cable 9 as tension is made on the cable 9 at most any horizontal angle of direction A1 of FIG. 1 for towing the trailer 14 toward the tow vehicle 5. Angle of direction A1 of FIG. 1 can vary in the range of 20 degrees to 160 degrees more or less.

The curved surface 29 and the slope along L2 serves to provide a landing of the trailer hitch coupler 3 over the coupling ball 1 as best shown in FIG. 6. As the trailer hitch coupler 3 is drawn onto the coupling ball 1 by cable 9 pulling in the direction 9D of FIG. 6 through the hole 41 in coupling ball 1, momentum of the trailer 14 in the direction 2A of FIG. 6 will cause the trailer hitch coupler 3 to slide along the length of L2 over the coupling ball 1 to effect engagement of the hitch system as illustrated by the dashed line in FIG. 6. In addition, the spring 28 will extend as tension is reduced on cable 9 from slack in said cable 9 when the trailer hitch coupler 3 nests on the coupling ball 1, thereby keeping said cable taut and prevent binding of cable 9 between trailer hitch coupler 3 and coupling ball 1 as engagement occurs. The compressed state of spring 28 is best illustrated in FIG. 6 when the trailer hitch coupler 3 is positioned over the coupling ball 1 and not yet nested on said ball.

Figure 9:
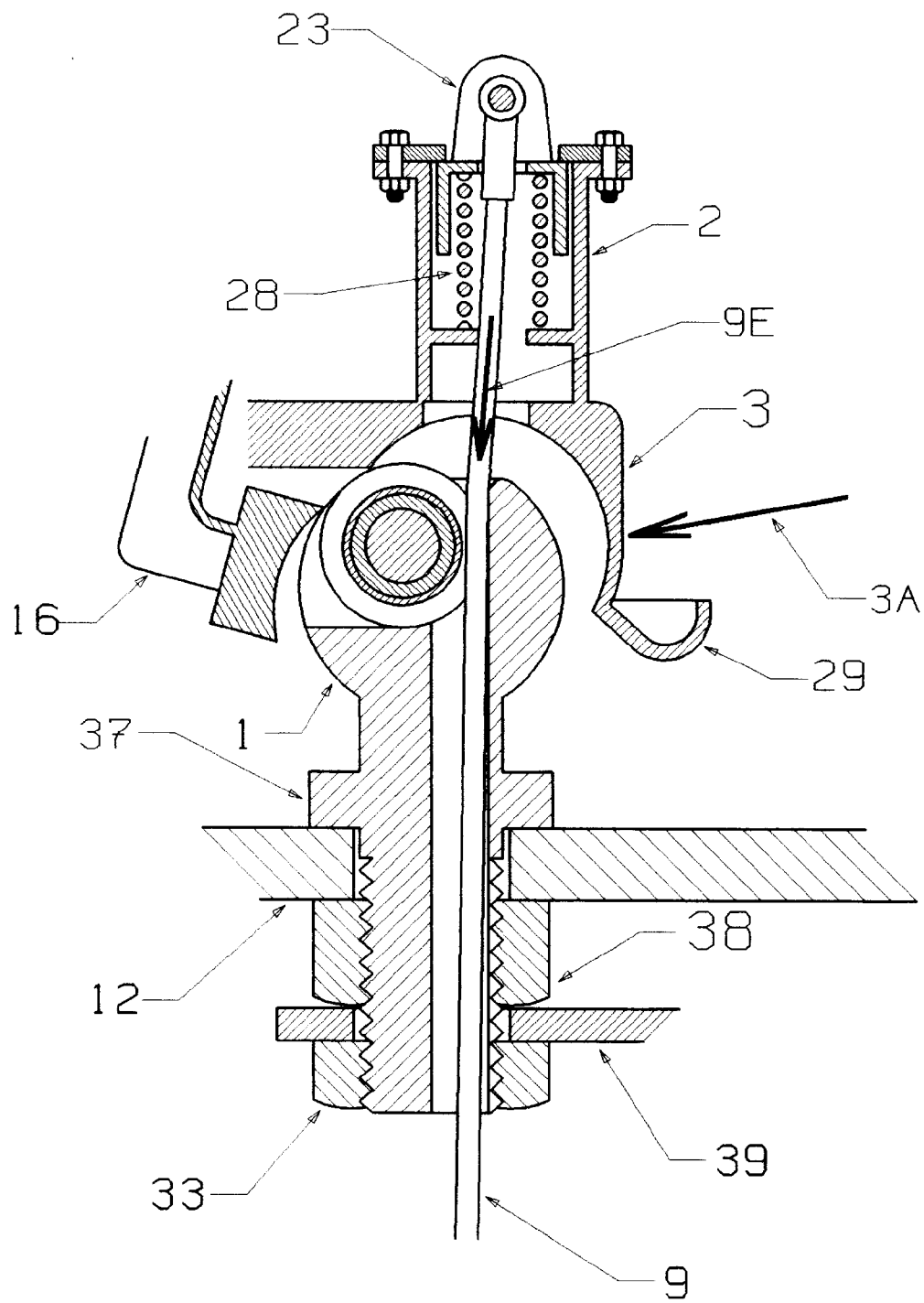
FIG. 9 is a fragmentary combined view of the sectional views of FIG. 2 and FIG. 3 showing the improper nested position of the trailer hitch coupler on the tow vehicle coupling ball.

The relative location of housing 2 on trailer hitch coupler 3 in FIG. 2 must be such that the cable 9 assists in nesting of the spherical surface 30, a part of trailer hitch coupler 3, onto the coupling ball without manual effort of the operator to effect proper engagement, thereby allowing locking lever 16 to be rotated in place for securing the hitch system. The cable 9 assist in engagement is best shown in FIG. 9 where trailer hitch coupler 3 is in improper engagement with coupling ball 1. The cable 9 assist in engagement of the hitch is done by means of the proper angle of pull in direction 9E of FIG. 9 over the coupling ball 1 such that the trailer hitch coupler 3 is pulled in the direction 3A of FIG. 9 into said nesting position to effect self alignment of the coupling ball joint. Improper engagement of the trailer hitch coupler 3 as shown in FIG. 9 can result from too much momentum from trailer 14 when engagement of the trailer hitch coupler 3 and coupling ball 1 occurs, causing the trailer hitch coupler 3 to over extend the coupling ball 1 and bind the locking lever 16 in the open position on the coupling ball 1.

FIG. 3 best shows the cable guiding pulley 34 mounted inside coupling ball 1 such that the outer dimensions of pulley 34 does not contact the surface 30 of the trailer hitch coupler 3 when fully engaged with coupling ball 1. Pulley 34 in FIG. 3 houses a bearing 35 which rotates about pin 36. Pulley 34 provides a rolling surface for cable 9 to bend over coupling ball 1 and through a hole 41 that penetrates through the length of said coupling ball 1 and the threaded shank 32 which is a part of the coupling ball 1. Coupling ball 1 is mounted on bumper 12 and held in place with threaded nut 38 against flange 37 which is a part of coupling ball 1 as shown in FIG. 3. Another pulley 40, which is similar to pulley 34 is mounted on bracket 39 which is in turn held in position at the bottom of threaded shank 32 by nut 33. Pulley 40 serves to guide cable 9 in the direction 9C of FIG. 3 as the cable 9 is drawn through the coupling ball 1 to effect engagement of the trailer hitch coupler 3. Pulley bracket 39 can be rotated at most any horizontal angle around the coupling ball shank 32 to guide the cable 9 toward a remote location of the winch 7 or other pulleys to effect winding of cable 9 on the drum of winch 7. Also shown in FIG. 3 is a cross section of a horizontal roller 4 mounted on vertical plate 13 and serves to provide a rolling surface for cable 9, shown in FIG. 3 as a dashed line, to deflect toward the coupling ball 1 as cable 9 is drawn through the coupling ball 1.

FIG. 5 best shows how the pin 36 is locked in place inside of the coupling ball 1 by means of a snap ring 43 nested in the coupling ball 1 and a set screw 44 drilled and tapped in said coupling ball 1. Additionally as best shown in FIG. 5, is the shape of pulley 34 to provide for nesting of cable 9 in said pulley 34 such that cable 9 can be guided through coupling ball 1.

FIG. 7 shows a sectional plan view of the relative position of the hole 41 located in the body of the coupling ball 1 providing a means by which the cable 9 can be guided through the coupling ball 1.

FIG. 8 best shows the nesting position of the hitch system after engagement of the trailer hitch coupler 3 over the coupling ball 1. Additionally shown in FIG. 8, that is not shown in any of the other appended drawings, is limit switch 45. Limit switch 45, when in contact with surface 29 on the trailer hitch coupler 3 at the time when the trailer hitch coupler 3 nests on the coupling ball 1 to effect engagement of the hitch system, will close a set of electric contacts to automatically stop the winch 7 by means of an electric brake.

I claim:

1. A combination hitch system which couples a trailer to a tow vehicle comprising:
   (a) a tow vehicle having a coupling joint attached,
   (b) a trailer having a trailer hitch coupler attached and the trailer hitch coupler having means to releasibly secure the coupling joint to the trailer hitch coupler,
   (c) a connection located on top of the trailer hitch coupler,
   (d) a cable having two ends, wherein one end of the cable is releasibly attached to the connection on the trailer hitch coupler and the other end of the cable is attached to a winch means on the tow vehicle with the cable passing through a hole in the coupling joint.

2. A combination hitch system as defined in claim 1 wherein said tow vehicle having said coupling joint further includes a system of pulleys to provide for guiding means of said cable through the coupling joint and to the winch means on the tow vehicle.

3. A combination hitch system as defined in claim 2 wherein said coupling joint having a center further including a hole drilled vertically through the center or near the center of said coupling joint to provide a cavity allowing said cable to draw through the coupling joint.

4. A combination hitch system as defined in claim 3 wherein said coupling joint further includes a pulley of the said system of pulleys as an integral part of said coupling joint wherein said cable nests in said pulley and is drawn around said pulley through the hole in the coupling joint providing a rolling surface to guide the cable through the hole in said coupling joint thereby reducing wear of said cable and provide winching means to urge the trailer to the tow vehicle effecting engagement of the hitch system.

5. A combination hitch system as defined in claim 1 wherein said cable having a spring actuating means between the connection on the trailer hitch coupler and the winch means to keep the cable taut as the trailer hitch coupler nests on and is secured to said coupling joint thereby effecting engagement of the hitch system without binding said cable between the trailer hitch coupler and coupling joint.

6. A combination hitch system as defined in 1 wherein said connection located on the top of the trailer hitch coupler further comprises a releasable attachment means for one end of the cable.

7. A combination hitch system as defined in claim 6 wherein said trailer hitch coupler further comprises a hole in the top of the trailer hitch coupler through which the cable passes from the bottom of the trailer hitch coupler to the releasable attachment means to connect one end of the cable to the said connection of the trailer hitch coupler thereby providing means for nesting said trailer hitch coupler on the coupling joint by winch means of said cable through the coupling joint without binding the cable between the trailer hitch coupler and the coupling joint.

8. A combination hitch system having a selfaligning coupling assist means comprising:

(a) a tow vehicle having a coupling joint attached, (b) a trailer having a trailer hitch coupler attached and the trailer hitch coupler having means to releasibly secure the coupling joint to the trailer hitch coupler, (c) a connection located on top of the trailer hitch coupler, (d) a cable having two ends, wherein one end of the cable is releasibly attached to the connection on the trailer hitch coupler and the other end of the cable is attached to a winch means on the tow vehicle with the cable passing through a hole in the coupling joint.

9. A combination hitch system as defined in claim 8 further including said cable having winch means to urge the trailer to the tow vehicle whereby the tow vehicle may be positioned at any horizontal angle (A1) in relation to the trailer and said coupling joint of the tow vehicle is in close proximity to allow for drawing said cable off the winch and releasably connecting one end of said cable to the connection on the trailer hitch coupler.

10. A combination hitch system as defined in claim 9 further including said cable having winch means to urge the trailer to the tow vehicle thereby guiding the trailer hitch coupler toward the coupling joint and lifting the trailer hitch coupler onto the coupling joint providing for selfaligning coupling assist effecting engagement of the hitch system without having to move the tow vehicle to precisely align the trailer hitch coupler over the coupling joint.

11. A combination hitch system as defined in claim 8 further including said tow vehicle having a system of pulleys providing means to draw said cable through the hole of the coupling joint on the rolling surfaces of said pulleys thereby preventing damage to the cable.

12. A combination hitch system as defined in claim 11 further including a coupling joint attached to said tow vehicle having a hole for drawing the cable through the coupling joint by winch means to provide for engagement of the hitch system without binding the cable between the trailer hitch coupler and the coupling joint thereby preventing damage to the cable.

13. A combination hitch system as defined in claim 12 wherein said coupling joint further includes a pulley of the said system of pulleys as an integral part of said coupling joint wherein said cable nests in said pulley and is drawn around said pulley through the hole in the coupling joint providing a rolling surface to guide the cable through the hole in said coupling joint thereby lifting the trailer hitch coupler onto the coupling joint providing for selfaligning coupling assist whereby engagement of the hitch system is effected.

14. A combination hitch system as defined in claim 8 further including said cable having a spring actuating means between the connection on the trailer hitch coupler and the winch to keep the cable taut as the trailer hitch coupler nests on and is secured to said coupling joint thereby effecting engagement of the hitch system without binding said cable between the trailer hitch coupler and coupling joint.

15. A combination hitch system as defined in 8 wherein said connection located on the top of the trailer hitch coupler further comprises a releasable attachment means for one end of the cable.

16. A combination hitch system as defined in claim 15 wherein said trailer hitch coupler further comprises a hole in the top of the trailer hitch coupler through which the cable passes from the bottom of the trailer hitch coupler to the releasable attachment means to connect one end of the cable to the trailer hitch coupler thereby providing means for nesting said trailer hitch coupler on the coupling joint by winch means of said cable through said coupling joint.

\* \* \* \* \*